Jan. 20, 1970    H. HEIMBERGER    3,490,109
FLUIDTIGHT SLIDE FASTENER
Filed July 5, 1967    3 Sheets-Sheet 1
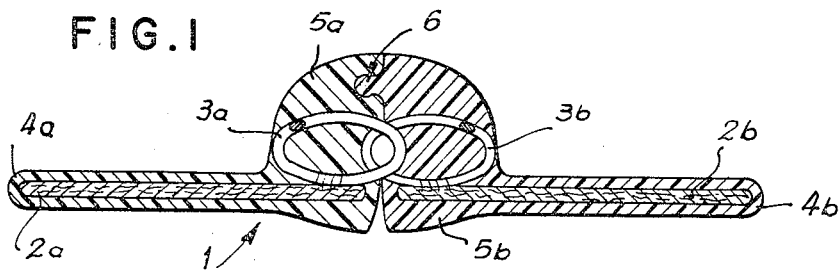
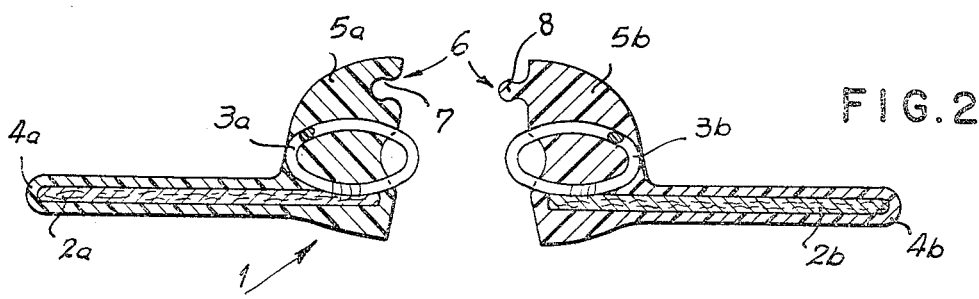
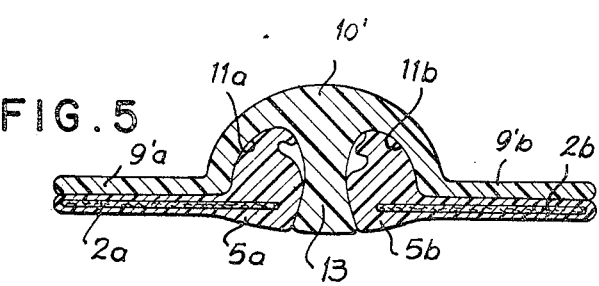
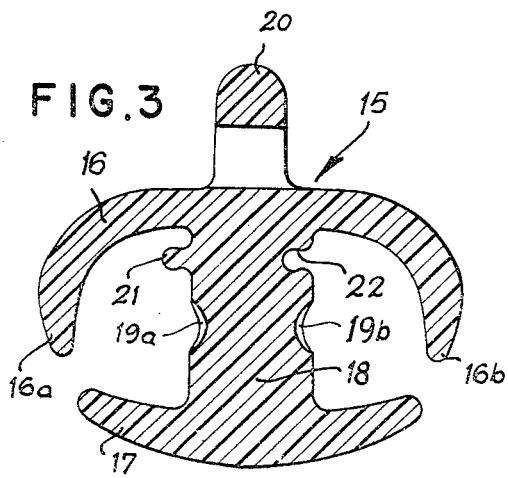
INVENTOR:
HELMUT HEIMBERGER
BY
ATTORNEY

INVENTOR:
HELMUT HEIMBERGER
BY
ATTORNEY

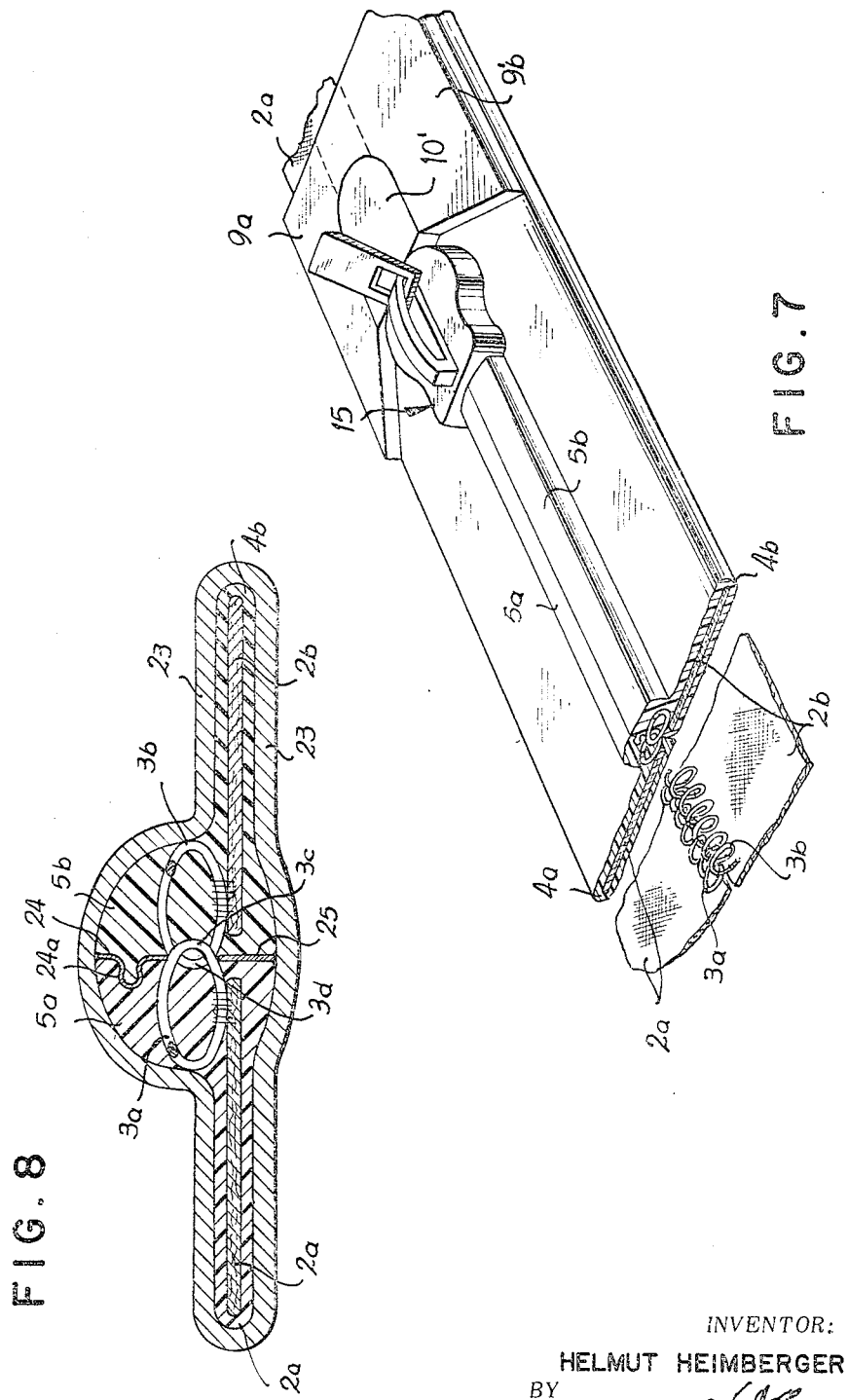

United States Patent Office
3,490,109
Patented Jan. 20, 1970

3,490,109
FLUIDTIGHT SLIDE FASTENER
Helmut Heimberger, Essen, Germany, assignor to Opti-Holding A.G., Glarus, Switzerland, a Swiss corporation
Filed July 5, 1967, Ser. No. 651,269
Claims priority, application Germany, July 6, 1966, O 11,784
Int. Cl. A44b *19/00, 19/10*
U.S. Cl. 24—205.1                    8 Claims

ABSTRACT OF THE DISCLOSURE

Slide fastener whose halves consist of continuous filaments, of helicoidal or meandering configuration, almost completely imbedded in respective sealing strips of elastomeric material which meet in the plane of symmetry of the fastener and are provided with complementary elongated formations extending over the full length of each strip, these formations yieldably interlocking upon closure of the fastener and being also in mating engagement with a projection and a recess, respectively, of an associated slider.

---

Figure 6:
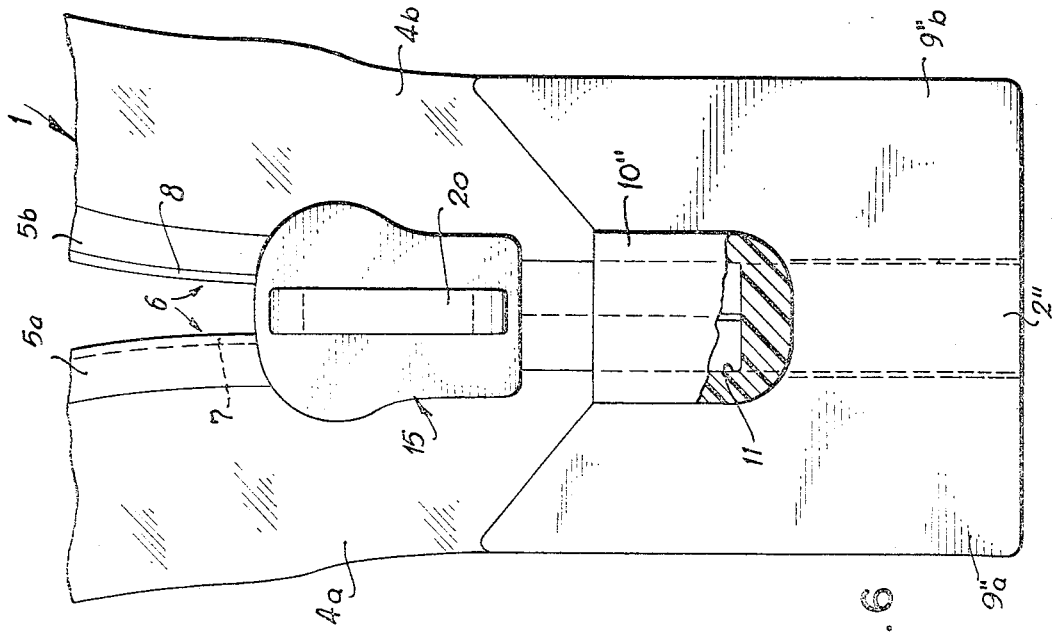

My present invention relates to a fluidtight slide fastener of the type disclosed in my copending application Ser. No. 534,356 filed Mar. 15, 1966 (now U.S. Patent No. 3,389,441).

Slide fasteners are frequently used as closure means for garments or other articles (e.g. inflatable rafts, sleeping bags, tents) which are exposed to the weather, used under water or otherwise employed under conditions requiring an effective seal against fluid penetration.

In my above-identified prior application I have disclosed a fluidtight fastener whose interengageable coupling members, e.g. helicoidal or meandering filaments of thermally seat linear polyamide, are permeated by an elastomeric mass of synthetic resin which forms a pair of elongated sealing strips containing each other in the closed condition of the fastener. The elastomeric material, such as foamed polyurethane, may also envelop the stringer tapes conventionally serving as carriers for the respective slide-fastener halves.

The general object of my present improvement is to enhance the sealing effect of the elastomeric strips disclosed in my prior application.

An ancillary object is to provide improved endstops effectively coacting with the elastomeric strips to prevent leakage at the extremities of the fastener.

It is also an object of this invention to provide an expeditious method of mass-producing such fasteners.

These objects are realized, pursuant to my present invention, by providing mutually complementary, yieldably interlocking formations along confronting longitudinal surfaces of the two elastomeric strips. These formations, advantageously comprising one or more grooves and one or more ribs extending over the full length of the strips, should have sufficient shear strength to resist transverse stresses which otherwise might deform the fastener halves as to create a leakage path. Thus, besides making the assembly truly fluidtight, these formations also serve as effective reinforcements for the coupling members of the fastener.

According to another feature of my invention, a slider coacting with the two fastener halves and straddling the associate elastomeric strips is in positive engagement with the aforementioned formations by being provided, on opposite sides of its web, with a recess and a projection respectively mating with the male and female portions of the elastomeric seal.

According to still another feature, an endstop for the slider may be formed from the same or similar elastomeric material as the two sealing strips in such manner as to envelop the extremities of the latter, thereby firmly anchoring these strips to the underlying stringer tapes at locations beyond the ends of the coupling members. If the fastener forms a closure for a slit closed at both ends, two such endstops may be provided. In that case, also, the endstop confronting the fastener in the closure position thereof may be formed with a resilient bumper, e.g. of soft rubber or of more porous elastomeric material, interposed between two transversely spaced channels which receive the extremities of the two sealing strips, this bumper engaging the slider (specifically the blunt end of its preferably wedge-shaped web) in its terminal position to prevent undue deformation of the strips.

Another aspect of my invention relates to the manufacture of the slide-fastener assembly with its sealing strips by an extrusion process. The joint extrusion of the coupling members and their elastomeric fillers has already been suggested in my above-identified prior application and, as disclosed there, may be followed by a shaping operation (e.g. between rollers) to which the sealing strips may be individually subjected in a partially cured state after being separated from each other. In accordance with a further development of this technique, pursuant to my present invention, the separation of the extruded strips is accomplished, with the aid of a suitably shaped blade, along a transverse median line having a looped portion which conforms to the cross-sectional outline of the complementary sealing formations.

Figure 4:
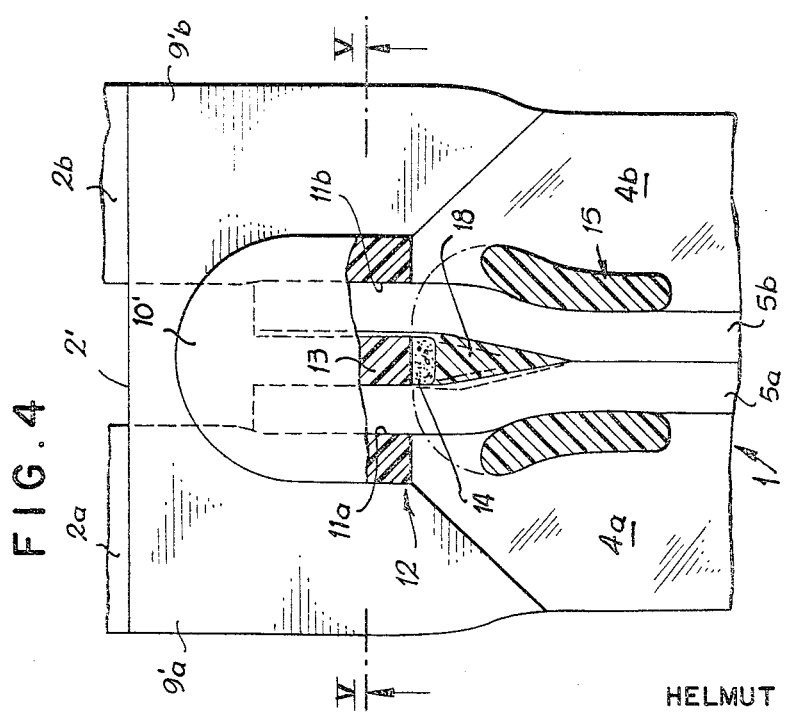

The invention will be described in greater detail with reference to the accompanying drawing in which:

FIG. 1 is a cross-sectional view of a closed slide fastener embodying the invention;
FIG. 2 is a view similar to FIG. 1, showing the fastener in its open state;
FIG. 3 is a cross-sectional view of a slider associated with the fastener of FIGS. 1 and 2;
FIG. 4 is a top view of the slider of FIG. 3 along with an adjoining endstop;
FIG. 5 is a cross-sectional view through the endstop, taken on the line V—V of FIG. 3;
FIG. 6 is a view similar to FIG. 4, showing the slider juxtaposed with a second endstop;
FIG. 7 is a perspective view of part of a slide-fastener assembly according to the invention, with the sealing strips partly broken away; and
FIG. 8 is a cross-sectional view of the assembly in the process of extrusion.

The slide fastener shown in the drawing, generally designated 1, comprises a pair of conventional, interengageable coupling members 3*a*, 3*b* in the form of helicoidal filaments, e.g. of nylon, stitched or otherwise fastened to a pair of stringer tapes 2*a*, 2*b*. The projecting loop portions or heads of each fastener half 3*a*, 3*b*, forming a row of teeth receivable in the gaps between the teeth of the opposite half, may be conventionally deformed (e.g. flattened) so as to exhibit resiliently interlocking projections 3*c*, 3*d* (FIG. 8).

Each fastener half 3*a*, 3*b* is enveloped, except for the immediate vicinity of its teeth 3*c*, 3*d*, by an elastomeric sealing strip 5*a*, 5*b*, preferably of foam plastic. The sealing strips are integrally extended at 4*a*, 4*b* to form coatings enveloping the tapes 2*a*, 2*b*. A longitudinal seal, generally designated 6, is provided by the interengagement of a longitudinal groove 7 on strip 5*a* and longitudinal rib 8 on strip 5*b*, the rib 8 being slightly undercut for a positive but releasable interlocking of these two formations. Formations 7, 8 extend over the entire length of the respective strips.

A slider 15, astride the strips 5a, 5b, is movable along the fastener 1 between a pair of endstops 10', 10". Upon closure of the fastener, slider 15 abuts the endstop 10' as shown in FIGS. 4 and 7; when the fastener is fully opened, the slider rests against the endstop 10" (FIG. 6). Each of these endstops is in the form of an elastomeric cap, e.g. of foamed polyurethane like the strops 5a, 5b, having integral lateral extensions 9a', 9b' or 9a", 9b" which overlie the elastomeric layers 4a, 4b and are firmly secured thereto, advantageously by thermal bonding. Cap 10' has a pair of transversely spaced channels 11a, 11b receiving the corresponding "upper" extremities of strips 5a and 5b; cap 10" has a single such channel 11 accommodating the opposite "lower" extremities of the strips. Channels 11a and 11b are separated by a web 13 having an elastic pad 14 of soft rubber or plastic secured thereto.

Slider 15 consists, as best seen in FIG. 3, of a curved upper plate 16 with depending flanges 16a, 16b, a lower plate 17 and an interconnecting web 18 having recesses 19a, 19b to guide the exposed heads of fastener members 3a, 3b. As best seen in FIG. 4, the web 18 is generally wedge-shaped and converges toward the "bottom" endstop 10"; its blunt end bears against the bumper 14 in the terminal position of FIGS. 4 and 7. In addition, web 18 is provided on one side with a riblike projection 21 and on the opposite side with a corresponding recess 22 in permanent engagement with groove 7 and the rib 8, respectively, of strips 5a and 5b which are straddled by the flanges 16a, 16b. A handle 20 is integral with the upper plate 16 of the slider.

Although the two sealing strips 5a, 5b with their extensions 4a, 4b could be molded separately around tapes 2a, 2b and filaments 3a, 3b, I prefer to produce them by joint extrusion with the aid of a nozzle 23 as illustrated in FIG. 8. A blade 24, having a looped portion 24a, and a counterblade 25 in line therewith, both extending generally along the longitudinal plane of symmetry of the fastener, are mounted in the nozzle 23 to sever the elastomeric mass into its strip portions 5a, 5b. The molded strips, emerging from the nozzle along with the coupling members 3a, 3b imbedded therein, can then be further deformed before final hardening, e.g. with constriction of the groove 7 to compensate for the thickness of blade 24.

If the slider 15 should be lost or destroyed, a temporary closure and a certain measure of protection against leakage can still be obtained by forcing the rib 8 into the groove 7 without interlocking of the fastener halves 3a, 3b.

I claim:

1. A fluidtight slide-fastener assembly comprising a pair of stringer tapes extending alongside each other; a pair of elongated coupling members respectively secured to said tapes along confronting edges thereof, each of said members having a multiplicity of loops transverse to the tapes and forming a row of teeth separated by gaps to receive the teeth of the other coupling member; and a pair of sealing strips of elastomeric material each coextensive with a respective coupling member and substantially enveloping same on the side remote from said stringer tapes while filling the interstices between said loops but leaving said teeth and gaps exposed, said strips being provided with generally parallel confronting longitudinal surfaces adapted to engage upon interconnection of said members along a plane parallel to said members but perpendicular to said tapes, said surfaces being provided with complementary formations yieldably interlocking upon interengagement of said coupling members.

2. A fluidtight slide-fastener assembly comprising a a pair of stringer tapes extending alongside each other; a pair of elongated coupling members respectively secured to said tapes along confronting edges thereof, each of said members forming a row of teeth separated by gaps to receive the teeth of the other coupling member; a pair of sealing strips of elastomeric material each coextensive with a respective coupling member and substantially enveloping same on the side remote from said stringer tapes while leaving said teeth and gaps exposed, said strips being provided along confronting longitudinal surfaces with complementary formations including a continuous rib and a continuous groove, respectively, extending the full length of said coupling members and yieldably interlocking upon interengagement of said coupling members; and a slider astride said strips and movable along said coupling members for interengaging and mutually disengaging same, said slider having a lateral projection received in said groove and a lateral recess receiving said rib.

3. An assembly as defined in claim 2 wherein said slider comprises a pair of plates interconnected by a wedge-shaped web, said recess and said projection being provided on opposite sides of said web.

4. A fluidtight slide-fastener assembly comprising a pair of stringer tapes extending alongside each other; a pair of elongated coupling members respectively secured to said tapes along confronting edges thereof, each of said members forming a row of teeth separated by gaps to receive the teeth of the other coupling member; a pair of sealing strips of elastomeric material each coextensive with a respective coupling member and substantially enveloping same on the side remote from said stringer tapes while leaving said teeth and gaps exposed, said strips being provided along confronting longitudinal surfaces with complementary formations yieldably interlocking upon interengagement of said coupling members; a slider straddling said strips and movable along said coupling members for interengaging and mutually disengaging same, and at least one endstop for said slider bridging said stringer tapes at a location beyond said coupling members, said endstop being a cap of elastomeric material enveloping the extremities of said strips.

5. An assembly as defined in claim 4 wherein said cap is provided with a pair of channels receiving said extremities and with a resilient bumper between said extremities engageable by said slider in a terminal position thereof.

6. An assembly as defined in claim 5 wherein said stringer tapes are provided with elastomeric coatings integral with the respective strips, said cap having integral lateral extensions overlying said coatings in bonded relationship therewith.

7. An assembly as defined in claim 4 wherein said formations extend over the full length of said coupling members.

8. An assembly as defined in claim 2 wherein said formations are a continuous rib and a continuous groove, respectively.

References Cited

UNITED STATES PATENTS

| | | |
|---|---|---|
| 2,567,298 | 9/1951 | Morner. |
| 2,978,770 | 4/1961 | Sperry. |
| 3,035,956 | 5/1962 | Gonda. |
| 3,147,529 | 9/1964 | Wilcken. |

BERNARD A. GELAK, Primary Examiner